(12) United States Patent
Burleigh et al.

(10) Patent No.: US 9,458,780 B2
(45) Date of Patent: Oct. 4, 2016

(54) SYSTEMS AND METHODS FOR CONTROLLING CYLINDER DEACTIVATION PERIODS AND PATTERNS

(71) Applicant: GM Global Technology Operations LLC, Detroit, MI (US)

(72) Inventors: Darrell W. Burleigh, Wixom, MI (US); Randall S. Beikmann, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 327 days.

(21) Appl. No.: 13/798,701

(22) Filed: Mar. 13, 2013

(65) Prior Publication Data

US 2014/0069378 A1    Mar. 13, 2014

Related U.S. Application Data

(60) Provisional application No. 61/698,816, filed on Sep. 10, 2012.

(51) Int. Cl.
*F02D 41/00* (2006.01)
*F02D 13/02* (2006.01)
(Continued)

(52) U.S. Cl.
CPC ....... *F02D 41/0087* (2013.01); *F02D 13/0219* (2013.01); *F02D 13/06* (2013.01); *F02D 17/02* (2013.01); *F02D 2041/0012* (2013.01); *Y02T 10/18* (2013.01)

(58) Field of Classification Search
CPC ........... F02D 41/0087; F02D 41/1401; F02D 41/1402; F02D 41/266; F02D 41/3058; F02D 41/365; F02D 2041/0012; F02D 17/02
USPC ...... 123/350, 198 F, 481; 701/103, 104, 105
See application file for complete search history.

(56) References Cited

U.S. PATENT DOCUMENTS 3,596,640 A    8/1971  Bloomfield
4,129,034 A    12/1978 Niles et al.
(Continued)

FOREIGN PATENT DOCUMENTS

CN    1573916 A    2/2005
CN    1888407 A    1/2007
(Continued)

OTHER PUBLICATIONS

U.S. Appl. No. 13/798,351, filed Mar. 13, 2013, Rayl.
(Continued)

*Primary Examiner* — Lindsay Low
*Assistant Examiner* — George Jin (57) ABSTRACT

Based on a desired average number of activated cylinders per sub-period of a predetermined period including P sub-periods, a cylinder control module selects one of N predetermined cylinder activation/deactivation patterns. The selected cylinder activation/deactivation pattern corresponds to Q activated cylinders per sub-period, Q is an integer between zero and a total number of cylinders of an engine, inclusive, P is an integer greater than one, and the desired average number of active cylinders is a number between zero and the total number of cylinders of the engine. The cylinder control module also determines an adjusted cylinder activation/deactivation pattern based on the selected predetermined cylinder activation/deactivation pattern, generates a desired cylinder activation/deactivation pattern for the predetermined period using the selected predetermined cylinder activation/deactivation pattern during a first number of the P sub-periods and using the adjusted cylinder activation/deactivation pattern during a second number of the P sub-periods.

16 Claims, 4 Drawing Sheets

(51) Int. Cl.
  *F02D 13/06* (2006.01)
  *F02D 17/02* (2006.01)

(56) References Cited

U.S. PATENT DOCUMENTS

| | | |
|---|---|---|
| 4,172,434 A | 10/1979 | Coles |
| 4,377,997 A | 3/1983 | Staerzl |
| 4,434,767 A | 3/1984 | Kohama et al. |
| 4,489,695 A | 12/1984 | Kohama et al. |
| 4,509,488 A | 4/1985 | Forster et al. |
| 4,535,744 A | 8/1985 | Matsumura |
| 4,770,148 A | 9/1988 | Hibino et al. |
| 4,887,216 A | 12/1989 | Ohnari et al. |
| 4,974,563 A | 12/1990 | Ikeda et al. |
| 4,987,888 A | 1/1991 | Funabashi et al. |
| 5,042,444 A | 8/1991 | Hayes et al. |
| 5,094,213 A | 3/1992 | Dudek et al. |
| 5,226,513 A | 7/1993 | Shibayama |
| 5,278,760 A | 1/1994 | Ribbens et al. |
| 5,357,932 A | 10/1994 | Clinton et al. |
| 5,374,224 A | 12/1994 | Huffmaster et al. |
| 5,377,631 A * | 1/1995 | Schechter ............. 123/198 F |
| 5,423,208 A | 6/1995 | Dudek et al. |
| 5,465,617 A | 11/1995 | Dudek et al. |
| 5,540,633 A | 7/1996 | Yamanaka et al. |
| 5,553,575 A | 9/1996 | Beck et al. |
| 5,584,266 A | 12/1996 | Motose et al. |
| 5,669,354 A | 9/1997 | Morris |
| 5,692,471 A | 12/1997 | Zhang |
| 5,720,257 A | 2/1998 | Motose et al. |
| 5,813,383 A | 9/1998 | Cummings |
| 5,884,605 A | 3/1999 | Nagaishi et al. |
| 5,909,720 A | 6/1999 | Yamaoka et al. |
| 5,931,140 A | 8/1999 | Maloney |
| 5,934,263 A | 8/1999 | Russ et al. |
| 5,941,927 A | 8/1999 | Pfitz |
| 5,975,052 A | 11/1999 | Moyer |
| 5,983,867 A | 11/1999 | Stuber et al. |
| 6,125,812 A | 10/2000 | Garabedian |
| 6,158,411 A | 12/2000 | Morikawa |
| 6,244,242 B1 | 6/2001 | Grizzle et al. |
| 6,247,449 B1 | 6/2001 | Persson |
| 6,272,427 B1 | 8/2001 | Wild et al. |
| 6,286,366 B1 | 9/2001 | Chen et al. |
| 6,295,500 B1 | 9/2001 | Cullen et al. |
| 6,332,446 B1 | 12/2001 | Matsumoto et al. |
| 6,334,425 B1 | 1/2002 | Nagatani et al. |
| 6,355,986 B1 | 3/2002 | Kato et al. |
| 6,360,724 B1 * | 3/2002 | Suhre et al. ............. 123/481 |
| 6,363,316 B1 | 3/2002 | Soliman et al. |
| 6,371,075 B2 | 4/2002 | Koch |
| 6,385,521 B1 | 5/2002 | Ito |
| 6,408,625 B1 | 6/2002 | Woon et al. |
| 6,520,140 B2 | 2/2003 | Dreymuller et al. |
| 6,546,912 B2 | 4/2003 | Tuken |
| 6,619,258 B2 | 9/2003 | McKay et al. |
| 6,622,548 B1 | 9/2003 | Hernandez |
| 6,694,806 B2 | 2/2004 | Kumagai et al. |
| 6,754,577 B2 | 6/2004 | Gross et al. |
| 6,760,656 B2 | 7/2004 | Matthews et al. |
| 6,850,831 B2 | 2/2005 | Buckland et al. |
| 6,909,961 B2 | 6/2005 | Wild et al. |
| 6,978,204 B2 | 12/2005 | Surnilla et al. |
| 6,980,902 B2 | 12/2005 | Nakazawa |
| 6,981,492 B2 | 1/2006 | Barba et al. |
| 6,983,737 B2 | 1/2006 | Gross et al. |
| 7,003,390 B2 | 2/2006 | Kaga |
| 7,024,301 B1 | 4/2006 | Kar et al. |
| 7,028,661 B1 | 4/2006 | Bonne et al. |
| 7,032,545 B2 | 4/2006 | Lewis et al. |
| 7,032,581 B2 | 4/2006 | Gibson et al. |
| 7,044,101 B1 | 5/2006 | Duty et al. |
| 7,063,062 B2 | 6/2006 | Lewis et al. |
| 7,066,121 B2 | 6/2006 | Michelini et al. |
| 7,066,136 B2 | 6/2006 | Ogiso |
| 7,069,718 B2 | 7/2006 | Surnilla et al. |
| 7,069,773 B2 | 7/2006 | Stempnik et al. |
| 7,086,386 B2 | 8/2006 | Doering |
| 7,100,720 B2 | 9/2006 | Ishikawa |
| 7,111,612 B2 | 9/2006 | Michelini et al. |
| 7,140,355 B2 | 11/2006 | Michelini et al. |
| 7,159,568 B1 | 1/2007 | Lewis et al. |
| 7,174,713 B2 | 2/2007 | Nitzke et al. |
| 7,174,879 B1 | 2/2007 | Chol et al. |
| 7,200,486 B2 | 4/2007 | Tanaka et al. |
| 7,203,588 B2 | 4/2007 | Kaneko et al. |
| 7,231,907 B2 | 6/2007 | Bolander et al. |
| 7,278,391 B1 | 10/2007 | Wong et al. |
| 7,292,231 B2 | 11/2007 | Kodama et al. |
| 7,292,931 B2 | 11/2007 | Davis et al. |
| 7,319,929 B1 | 1/2008 | Davis et al. |
| 7,363,111 B2 | 4/2008 | Vian et al. |
| 7,367,318 B2 | 5/2008 | Moriya et al. |
| 7,415,345 B2 | 8/2008 | Wild |
| 7,440,838 B2 | 10/2008 | Livshiz et al. |
| 7,464,676 B2 | 12/2008 | Wiggins et al. |
| 7,472,014 B1 | 12/2008 | Albertson et al. |
| 7,497,074 B2 | 3/2009 | Surnilla et al. |
| 7,499,791 B2 | 3/2009 | You et al. |
| 7,503,312 B2 | 3/2009 | Surnilla et al. |
| 7,509,201 B2 | 3/2009 | Bolander et al. |
| 7,555,896 B2 | 7/2009 | Lewis et al. |
| 7,577,511 B1 * | 8/2009 | Tripathi et al. ............. 701/103 |
| 7,581,531 B2 | 9/2009 | Schulz |
| 7,614,384 B2 | 11/2009 | Livshiz et al. |
| 7,620,188 B2 | 11/2009 | Inoue et al. |
| 7,621,262 B2 | 11/2009 | Zubeck |
| 7,634,349 B2 | 12/2009 | Senft et al. |
| 7,685,976 B2 | 3/2010 | Marriott |
| 7,785,230 B2 | 8/2010 | Gibson et al. |
| 7,836,866 B2 | 11/2010 | Luken et al. |
| 7,849,835 B2 | 12/2010 | Tripathi et al. |
| 7,886,715 B2 | 2/2011 | Tripathi et al. |
| 7,930,087 B2 | 4/2011 | Gibson et al. |
| 7,946,263 B2 | 5/2011 | O'Neill et al. |
| 7,954,474 B2 | 6/2011 | Tripathi et al. |
| 8,050,841 B2 | 11/2011 | Costin et al. |
| 8,099,224 B2 | 1/2012 | Tripathi et al. |
| 8,108,132 B2 | 1/2012 | Reinke |
| 8,131,445 B2 | 3/2012 | Tripathi et al. |
| 8,131,447 B2 | 3/2012 | Tripathi et al. |
| 8,135,410 B2 | 3/2012 | Forte |
| 8,145,410 B2 | 3/2012 | Berger et al. |
| 8,146,565 B2 | 4/2012 | Leone et al. |
| 8,272,367 B2 | 9/2012 | Shikama et al. |
| 8,347,856 B2 | 1/2013 | Leone et al. |
| 8,473,179 B2 | 6/2013 | Whitney et al. |
| 8,616,181 B2 | 12/2013 | Sahandiesfanjani et al. |
| 8,646,430 B2 * | 2/2014 | Kinoshita ............. 123/198 F |
| 8,646,435 B2 | 2/2014 | Dibble et al. |
| 8,701,628 B2 | 4/2014 | Tripathi et al. |
| 8,706,383 B2 | 4/2014 | Sauve et al. |
| 8,833,058 B2 | 9/2014 | Ervin et al. |
| 8,833,345 B2 | 9/2014 | Pochner et al. |
| 8,869,773 B2 | 10/2014 | Tripathi et al. |
| 8,979,708 B2 | 3/2015 | Burtch |
| 9,140,622 B2 | 9/2015 | Beikmann |
| 9,222,427 B2 | 12/2015 | Matthews et al. |
| 2001/0007964 A1 | 7/2001 | Poljansek et al. |
| 2002/0039950 A1 | 4/2002 | Graf et al. |
| 2002/0156568 A1 | 10/2002 | Knott et al. |
| 2002/0162540 A1 | 11/2002 | Matthews et al. |
| 2002/0189574 A1 | 12/2002 | Kim |
| 2003/0116130 A1 | 6/2003 | Kisaka et al. |
| 2003/0123467 A1 | 7/2003 | Du et al. |
| 2003/0131820 A1 | 7/2003 | Mckay et al. |
| 2003/0172900 A1 | 9/2003 | Boyer et al. |
| 2004/0007211 A1 | 1/2004 | Kobayashi |
| 2004/0034460 A1 | 2/2004 | Folkerts et al. |
| 2004/0069290 A1 | 4/2004 | Bucktron et al. |
| 2004/0122584 A1 | 6/2004 | Muto et al. |
| 2004/0129249 A1 | 7/2004 | Kondo |
| 2004/0206072 A1 | 10/2004 | Surnilla et al. |
| 2004/0258251 A1 | 12/2004 | Inoue et al. |

(56) References Cited

U.S. PATENT DOCUMENTS

| | | |
|---|---|---|
| 2005/0016492 A1 | 1/2005 | Matthews |
| 2005/0056250 A1 | 3/2005 | Stroh |
| 2005/0098156 A1 | 5/2005 | Ohtani |
| 2005/0131618 A1 | 6/2005 | Megli et al. |
| 2005/0197761 A1 | 9/2005 | Bidner et al. |
| 2005/0199220 A1 | 9/2005 | Ogiso |
| 2005/0204726 A1 | 9/2005 | Lewis |
| 2005/0204727 A1 | 9/2005 | Lewis et al. |
| 2005/0205028 A1 | 9/2005 | Lewis et al. |
| 2005/0205045 A1 | 9/2005 | Michelini et al. |
| 2005/0205060 A1 | 9/2005 | Michelini et al. |
| 2005/0205063 A1 | 9/2005 | Kolmanovsky et al. |
| 2005/0205069 A1 | 9/2005 | Lewis et al. |
| 2005/0205074 A1 | 9/2005 | Gibson et al. |
| 2005/0235743 A1 | 10/2005 | Stempnik et al. |
| 2006/0107919 A1 | 5/2006 | Nishi et al. |
| 2006/0112918 A1 | 6/2006 | Persson |
| 2006/0130814 A1 | 6/2006 | Bolander et al. |
| 2006/0178802 A1 | 8/2006 | Bolander et al. |
| 2007/0012040 A1 | 1/2007 | Nitzke et al. |
| 2007/0042861 A1 | 2/2007 | Takaoka et al. |
| 2007/0051351 A1 | 3/2007 | Pallett et al. |
| 2007/0100534 A1 | 5/2007 | Katsumata |
| 2007/0101969 A1 | 5/2007 | Lay et al. |
| 2007/0107692 A1 | 5/2007 | Kuo et al. |
| 2007/0131169 A1 | 6/2007 | Ahn |
| 2007/0131196 A1 | 6/2007 | Gibson et al. |
| 2007/0135988 A1 | 6/2007 | Kidston et al. |
| 2007/0235005 A1 | 10/2007 | Lewis |
| 2008/0000149 A1 | 1/2008 | Aradi |
| 2008/0041327 A1 | 2/2008 | Lewis et al. |
| 2008/0066699 A1 | 3/2008 | Michelini et al. |
| 2008/0098969 A1 | 5/2008 | Reed et al. |
| 2008/0109151 A1 | 5/2008 | Jaros et al. |
| 2008/0121211 A1 | 5/2008 | Livshiz et al. |
| 2008/0154468 A1 | 6/2008 | Berger et al. |
| 2008/0254926 A1 | 10/2008 | Schuseil et al. |
| 2008/0262698 A1 | 10/2008 | Lahti et al. |
| 2008/0288146 A1 | 11/2008 | Beechie et al. |
| 2009/0007877 A1 | 1/2009 | Raiford |
| 2009/0013667 A1 | 1/2009 | Winstead |
| 2009/0013668 A1 | 1/2009 | Winstead |
| 2009/0013669 A1 | 1/2009 | Winstead |
| 2009/0013969 A1 | 1/2009 | Winstead |
| 2009/0018746 A1 | 1/2009 | Miller et al. |
| 2009/0030594 A1 | 1/2009 | You et al. |
| 2009/0042458 A1* | 2/2009 | Kinoshita ............ 440/1 |
| 2009/0042463 A1 | 2/2009 | Kinoshita |
| 2009/0118914 A1 | 5/2009 | Schwenke et al. |
| 2009/0118968 A1 | 5/2009 | Livshiz et al. |
| 2009/0118975 A1 | 5/2009 | Murakami et al. |
| 2009/0118986 A1 | 5/2009 | Kita |
| 2009/0177371 A1 | 7/2009 | Reinke |
| 2009/0204312 A1 | 8/2009 | Moriya |
| 2009/0241872 A1 | 10/2009 | Wang et al. |
| 2009/0248277 A1 | 10/2009 | Shinagawa et al. |
| 2009/0248278 A1 | 10/2009 | Nakasaka |
| 2009/0292435 A1 | 11/2009 | Costin et al. |
| 2010/0006065 A1 | 1/2010 | Tripathi et al. |
| 2010/0010724 A1 | 1/2010 | Tripathi et al. |
| 2010/0012072 A1 | 1/2010 | Leone et al. |
| 2010/0030447 A1 | 2/2010 | Smyth et al. |
| 2010/0036571 A1 | 2/2010 | Han et al. |
| 2010/0042308 A1 | 2/2010 | Kobayashi et al. |
| 2010/0050993 A1 | 3/2010 | Zhao et al. |
| 2010/0059004 A1* | 3/2010 | Gill ............ 123/90.11 |
| 2010/0100299 A1* | 4/2010 | Tripathi et al. ............ 701/102 |
| 2010/0107630 A1 | 5/2010 | Hamama et al. |
| 2010/0192925 A1 | 8/2010 | Sadakane |
| 2010/0211299 A1 | 8/2010 | Lewis et al. |
| 2010/0222989 A1 | 9/2010 | Nishimura |
| 2010/0282202 A1 | 11/2010 | Luken |
| 2010/0318275 A1 | 12/2010 | Borchsenius et al. |
| 2011/0005496 A1 | 1/2011 | Hiraya et al. |
| 2011/0030657 A1* | 2/2011 | Tripathi et al. ............ 123/481 |
| 2011/0048372 A1* | 3/2011 | Dibble et al. ............ 123/350 |
| 2011/0088661 A1 | 4/2011 | Sczomak et al. |
| 2011/0094475 A1 | 4/2011 | Riegel et al. |
| 2011/0107986 A1 | 5/2011 | Winstead |
| 2011/0144883 A1* | 6/2011 | Rollinger et al. ............ 701/102 |
| 2011/0178693 A1 | 7/2011 | Chang et al. |
| 2011/0208405 A1 | 8/2011 | Tripathi et al. |
| 2011/0213540 A1 | 9/2011 | Tripathi et al. |
| 2011/0213541 A1 | 9/2011 | Tripathi et al. |
| 2011/0251773 A1 | 10/2011 | Sahandiesfanjani et al. |
| 2011/0264342 A1 | 10/2011 | Baur et al. |
| 2011/0265454 A1 | 11/2011 | Smith et al. |
| 2011/0265771 A1 | 11/2011 | Banker et al. |
| 2011/0295483 A1 | 12/2011 | Ma et al. |
| 2011/0313643 A1 | 12/2011 | Lucatello et al. |
| 2012/0029787 A1 | 2/2012 | Whitney et al. |
| 2012/0055444 A1* | 3/2012 | Tobergte et al. ............ 123/294 |
| 2012/0103312 A1 | 5/2012 | Sasai et al. |
| 2012/0109495 A1 | 5/2012 | Tripathi et al. |
| 2012/0116647 A1 | 5/2012 | Pochner et al. |
| 2012/0143471 A1 | 6/2012 | Tripathi et al. |
| 2012/0180759 A1 | 7/2012 | Whitney et al. |
| 2012/0221217 A1* | 8/2012 | Sujan et al. ............ 701/54 |
| 2012/0285161 A1* | 11/2012 | Kerns et al. ............ 60/598 |
| 2013/0092127 A1 | 4/2013 | Pirjaberi et al. |
| 2013/0092128 A1 | 4/2013 | Pirjaberi et al. |
| 2013/0184949 A1 | 7/2013 | Saito et al. |
| 2013/0289853 A1 | 10/2013 | Serrano |
| 2014/0041625 A1 | 2/2014 | Pirjaberi et al. |
| 2014/0041641 A1 | 2/2014 | Carlson et al. |
| 2014/0053802 A1* | 2/2014 | Rayl ............ 123/350 |
| 2014/0053803 A1 | 2/2014 | Rayl |
| 2014/0053804 A1 | 2/2014 | Rayl et al. |
| 2014/0053805 A1 | 2/2014 | Brennan et al. |
| 2014/0069178 A1 | 3/2014 | Beikmann |
| 2014/0069374 A1 | 3/2014 | Matthews |
| 2014/0069375 A1 | 3/2014 | Matthews et al. |
| 2014/0069376 A1 | 3/2014 | Matthews et al. |
| 2014/0069377 A1 | 3/2014 | Brennan et al. |
| 2014/0069378 A1 | 3/2014 | Burleigh et al. |
| 2014/0069379 A1 | 3/2014 | Beikmann |
| 2014/0069381 A1 | 3/2014 | Beikmann |
| 2014/0090623 A1* | 4/2014 | Beikmann ............ 123/350 |
| 2014/0090624 A1* | 4/2014 | Verner ............ 123/406.12 |
| 2014/0102411 A1 | 4/2014 | Brennan |
| 2014/0190448 A1 | 7/2014 | Brennan et al. |
| 2014/0190449 A1 | 7/2014 | Phillips |
| 2014/0194247 A1 | 7/2014 | Burtch |
| 2014/0207359 A1 | 7/2014 | Phillips |
| 2015/0240671 A1 | 8/2015 | Nakamura |
| 2015/0260112 A1 | 9/2015 | Liu et al. |
| 2015/0260117 A1 | 9/2015 | Shost et al. |
| 2015/0354470 A1 | 12/2015 | Li et al. |
| 2015/0361907 A1 | 12/2015 | Hayman et al. |

FOREIGN PATENT DOCUMENTS

| | | |
|---|---|---|
| CN | 101220780 A | 7/2008 |
| CN | 101353992 A | 1/2009 |
| CN | 101476507 A | 7/2009 |
| CN | 101586504 A | 11/2009 |
| CN | 102454493 A | 5/2012 |
| EP | 1489595 A2 | 12/2004 |
| JP | 2010223019 A | 10/2010 |
| JP | 2011149352 A | 8/2011 |

OTHER PUBLICATIONS

U.S. Appl. No. 13/798,384, filed Mar. 13, 2013, Burtch.
U.S. Appl. No. 13/798,400, filed Mar. 13, 2013, Phillips.
U.S. Appl. No. 13/798,435, filed Mar. 13, 2013, Matthews.
U.S. Appl. No. 13/798,451, filed Mar. 13, 2013, Rayl.
U.S. Appl. No. 13/798,471, filed Mar. 13, 2013, Matthews et al.
U.S. Appl. No. 13/798,518, filed Mar. 13, 2013, Beikmann.
U.S. Appl. No. 13/798,536, filed Mar. 13, 2013, Matthews et al.
U.S. Appl. No. 13/798,540, filed Mar. 13, 2013, Brennan et al.
U.S. Appl. No. 13/798,574, filed Mar. 13, 2013, Verner.
U.S. Appl. No. 13/798,586, filed Mar. 13, 2013, Rayl et al.

(56) References Cited

OTHER PUBLICATIONS

U.S. Appl. No. 13/798,590, filed Mar. 13, 2013, Brennan et al.
U.S. Appl. No. 13/798,624, filed Mar. 13, 2013, Brennan et al.
U.S. Appl. No. 13/798,737, filed Mar. 13, 2013, Beikmann.
U.S. Appl. No. 13/798,775, filed Mar. 13, 2013, Phillips.
U.S. Appl. No. 13/799,116, filed Mar. 13, 2013, Brennan.
U.S. Appl. No. 13/799,129, filed Mar. 13, 2013, Beikmann.
U.S. Appl. No. 13/799,181, filed Mar. 13, 2013, Beikmann.
U.S. Appl. No. 14/211,389, filed Mar. 14 2014, Liu et al.
U.S. Appl. No. 14,300,469, Jun. 10, 2014, Li et al.
U.S. Appl. No. 14/310,063, Jun. 20, 2014, Wagh et al.
U.S. Appl. No. 14/449,726, Aug. 1, 2014, Hayman et al.
U.S. Appl. No. 14/548,501, filed Nov. 20, 2014, Beikmann et al.
U.S. Appl. No. 61/952,737, filed Mar. 13, 2014, Shost et al.
International Search Report and Written Opinion dated Jun. 17, 2015 corresponding to International Application No. PCT/US2015/019496, 14 pages.
U.S. Appl. No. 14/734,619, filed Jun. 9, 2015, Matthews.

* cited by examiner

SYSTEMS AND METHODS FOR CONTROLLING CYLINDER DEACTIVATION PERIODS AND PATTERNS

CROSS-REFERENCE TO RELATED APPLICATIONS

This application claims the benefit of U.S. Provisional Application No. 61/698,816, filed on Sep. 10, 2012. The disclosure of the above application is incorporated herein by reference in its entirety.

This application is related to U.S. patent application Ser. No. 13/798,451 filed on Mar. 13, 2013, Ser. No. 13/798,351 filed on Mar. 13, 2013, Ser. No. 13/798,586 filed on Mar. 13, 2013, Ser. No. 13/798,590 filed on Mar. 13, 2013, Ser. No. 13/798,536 filed on Mar. 13, 2013, Ser. No. 13/798,435 Mar. 13, 2013, Ser. No. 13/798,471 filed on Mar. 13, 2013, Ser. No. 13/798,737 Mar. 13, 2013, Ser. No. 13/798,518 filed on Mar. 13, 2013, Ser. No. 13/799,129 Mar. 13, 2013, Ser. No. 13/798,540 Mar. 13, 2013, Ser. No. 13/798,574 filed on Mar. 13, 2013 , Ser. No. 13/799,181 filed on Mar. 13, 2013, Ser. No. 13/799,116 filed on Mar. 13, 2013, Ser. No. 13/798,624 filed on Mar. 13, 2013, Ser. No. 13/798,384 filed on Mar. 13, 2013, Ser. No. 13/798,775 filed on Mar. 13, 2013, and Ser. No. 13/798,400 filed on Mar. 13, 2013. The entire disclosures of the above applications are incorporated herein by reference.

FIELD

The present disclosure relates to cylinder deactivation control systems and methods for an internal combustion engine.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

Under some circumstances, one or more cylinders of an engine may be deactivated. Deactivation of a cylinder may include deactivating the opening and closing of intake valves of the cylinder and halting the fueling of the cylinder. One or more cylinders may be deactivated, for example, to decrease fuel consumption when the engine can produce a requested amount of torque while the one or more cylinders are deactivated.

SUMMARY

A cylinder control system includes a cylinder control module and a fuel control module. Based on a desired average number of activated cylinders per sub-period of a predetermined period including P sub-periods, the cylinder control module selects one of N predetermined cylinder activation/deactivation patterns. The one of the N predetermined cylinder activation/deactivation patterns corresponds to Q activated cylinders per sub-period, Q is an integer between zero and a total number of cylinders of an engine, inclusive, P is an integer greater than one, and the desired average number of active cylinders is a number between zero and the total number of cylinders of the engine. The cylinder control module also determines an adjusted cylinder activation/deactivation pattern based on the one of the N predetermined cylinder activation/deactivation patterns, generates a desired cylinder activation/deactivation pattern for the predetermined period using the one of the N predetermined cylinder activation/deactivation patterns during a first number of the P sub-periods and using the adjusted cylinder activation/deactivation pattern during a second number of the P sub-periods, activates opening of intake and exhaust valves of first ones of the cylinders that are to be activated based on the desired cylinder activation/deactivation pattern, and deactivates opening of intake and exhaust valves of second ones of the cylinders that are to be deactivated based on the desired cylinder activation/deactivation pattern. The fuel control module provides fuel to the first ones of the cylinders and disables fueling to the second ones of the cylinders.

A cylinder control method includes: based on a desired average number of activated cylinders per sub-period of a predetermined period including P sub-periods, selecting one of N predetermined cylinder activation/deactivation patterns. The one of the N predetermined cylinder activation/deactivation patterns corresponds to Q activated cylinders per sub-period, Q is an integer between zero and a total number of cylinders of an engine, inclusive, P is an integer greater than one, and the desired average number of active cylinders is an integer or non-integer between zero and the total number of cylinders of the engine. The cylinder control method further includes: determining an adjusted cylinder activation/deactivation pattern based on the one of the N predetermined cylinder activation/deactivation patterns; generating a desired cylinder activation/deactivation pattern for the predetermined period using the one of the N predetermined cylinder activation/deactivation patterns during a first number of the P sub-periods and using the adjusted cylinder activation/deactivation pattern during a second number of the P sub-periods; activating opening of intake and exhaust valves of first ones of the cylinders that are to be activated based on the desired cylinder activation/deactivation pattern; deactivating opening of intake and exhaust valves of second ones of the cylinders that are to be deactivated based on the desired cylinder activation/deactivation pattern; providing fuel to the first ones of the cylinders; and disabling fueling to the second ones of the cylinders.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

One or more cylinders of an engine of a vehicle may be deactivated and/or operated according to a selected deactivation pattern (i.e., sequence). For example, the engine includes a plurality of possible deactivation patterns, and the vehicle determines which of the deactivation patterns to implement and selects a deactivation pattern accordingly. The cylinders of the engine are selectively operated (i.e., fired or not fired) through one or more engine cycles based on the deactivation pattern. For example only, a control module of the vehicle determines the selected deactivation pattern based on a variety of factors including, but not limited to, a desired Effective Cylinder Count (ECC), respective fuel economies associated with each of the deactivation patterns and/or noise and vibration (N&V) associated each of the deactivation patterns. Fuel efficiency and N&V are, at least in part, based on the sequence in which cylinders are activated and deactivated (i.e., the deactivation pattern).

Each of a plurality of predetermined base patterns may correspond to an ECC that is an integer (e.g., 1, 2, 3, . . . , n, where n is the number of cylinders in the engine). A desired ECC corresponds to a desired engine output torque. More specifically, the desired ECC corresponds to a desired average number of activated cylinders during a predetermined period (e.g., a predetermined number of crankshaft revolutions, engine cycles, or cylinder events) to achieve the desired engine output torque during the predetermined period.

The predetermined period includes multiple predetermined sub-periods, each sub-period corresponding to the length of the predetermined base patterns. In a cylinder deactivation system according to the principles of the present disclosure, combinations of two or more of the predetermined base periods are used during the predetermined period to achieve a non-integer ECC. For example, to achieve a desired ECC of 6.5 with an 8 cylinder engine, a first predetermined base pattern where 6 of the 8 cylinders are activated (and 2 cylinders are deactivated) per sub-period may be used during some (e.g., half) of the predetermined sub-periods, and a second predetermined base pattern where 7 of the 8 cylinders are activated (and 1 cylinder is deactivated) per sub-period may be used during others (e.g., the other half) of the predetermined sub-periods. Thus, an average of 6.5 active cylinders per sub-period can be achieved during the predetermined period.

Figure 1:
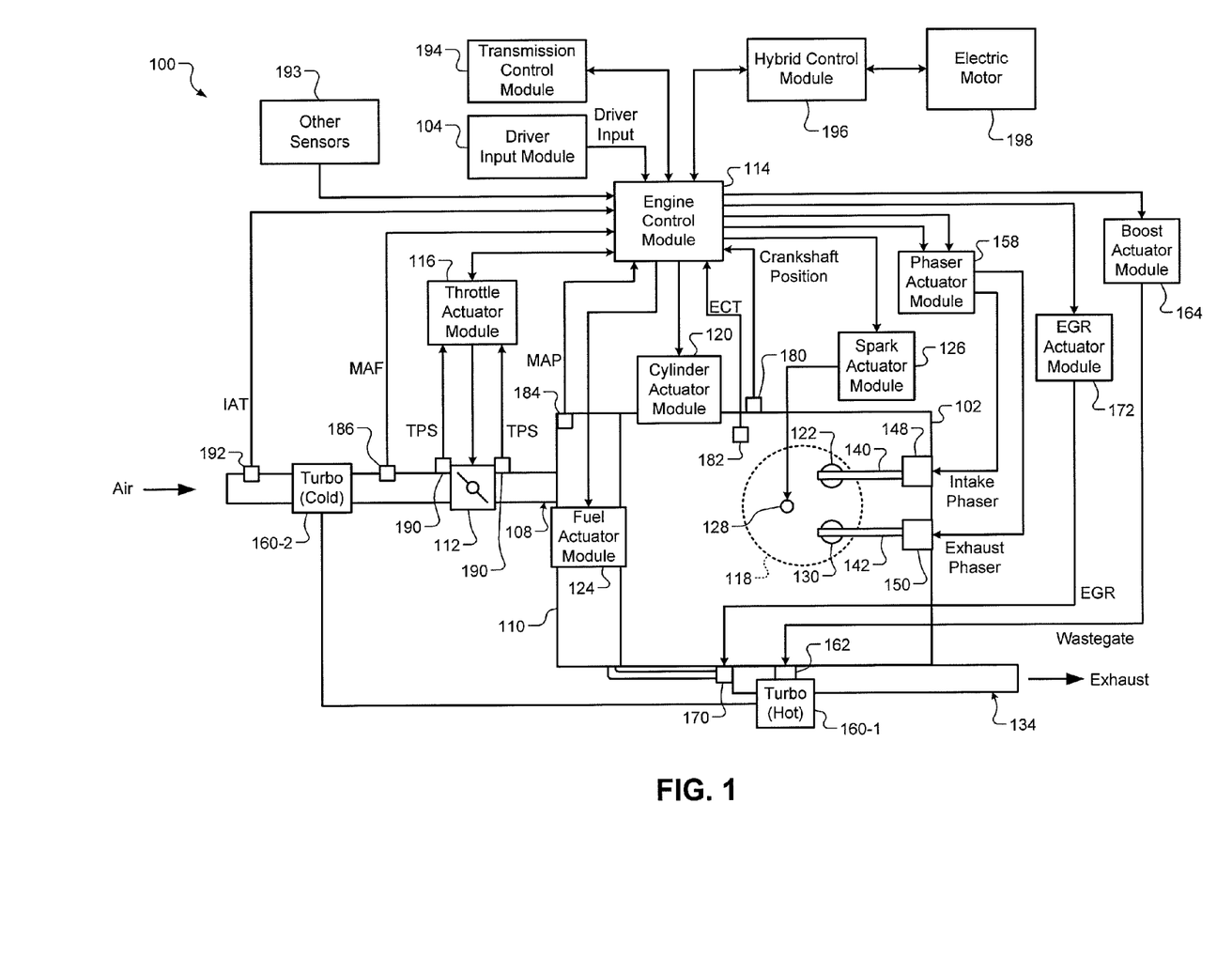
FIG. 1 is a functional block diagram of an example engine system according to the present disclosure.

Referring now to FIG. 1, a functional block diagram of an example engine system 100 is presented. The engine system 100 of a vehicle includes an engine 102 that combusts an air/fuel mixture to produce torque based on driver input from a driver input module 104. Air is drawn into the engine 102 through an intake system 108. The intake system 108 may include an intake manifold 110 and a throttle valve 112. For example only, the throttle valve 112 may include a butterfly valve having a rotatable blade. An engine control module (ECM) 114 controls a throttle actuator module 116, and the throttle actuator module 116 regulates opening of the throttle valve 112 to control airflow into the intake manifold 110.

Air from the intake manifold 110 is drawn into cylinders of the engine 102. While the engine 102 includes multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders under some circumstances, as discussed further below, which may improve fuel efficiency.

The engine 102 may operate using a four-stroke cycle. The four strokes, described below, will be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers/ports associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression causes ignition of the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. Some types of engines, such as homogenous charge compression ignition (HCCI) engines may perform both compression ignition and spark ignition. The timing of the spark may be specified relative to the time when the piston is at its topmost position, which will be referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with the position of the crankshaft. The spark actuator module 126 may halt provision of spark to deactivated cylinders or provide spark to deactivated cylinders.

During the combustion stroke, the combustion of the air/fuel mixture drives the piston down, thereby driving the crankshaft. The combustion stroke may be defined as the time between the piston reaching TDC and the time at which the piston returns to a bottom most position, which will be referred to as bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The cylinder actuator module 120 may deactivate the cylinder 118 by deactivating opening of the intake valve 122 and/or the exhaust valve 130. The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (not shown) may also be controlled by the phaser actuator module 158. In various other implementations, the intake valve 122 and/or the exhaust valve 130 may be controlled by actuators other than camshafts, such as electromechanical actuators, electrohydraulic actuators, electromagnetic actuators, etc.

The engine system 100 may include a boost device that provides pressurized air to the intake manifold 110. For example, FIG. 1 shows a turbocharger including a turbine 160-1 that is driven by exhaust gases flowing through the exhaust system 134. The turbocharger also includes a compressor 160-2 that is driven by the turbine 160-1 and that compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) of the turbocharger. The ECM 114 may control the turbocharger via a boost actuator module 164. The boost actuator module 164 may modulate the boost of the turbocharger by controlling the position of the wastegate 162. In various implementations, multiple turbochargers may be controlled by the boost actuator module 164. The turbocharger may have variable geometry, which may be controlled by the boost actuator module 164.

An intercooler (not shown) may dissipate some of the heat contained in the compressed air charge, which is generated as the air is compressed. Although shown separated for purposes of illustration, the turbine 160-1 and the compressor 160-2 may be mechanically linked to each other, placing intake air in close proximity to hot exhaust. The compressed air charge may absorb heat from components of the exhaust system 134.

The engine system 100 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172.

Crankshaft position may be measured using a crankshaft position sensor 180. A temperature of engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

Position of the throttle valve 112 may be measured using one or more throttle position sensors (TPS) 190. A temperature of air being drawn into the engine 102 may be measured using an intake air temperature (IAT) sensor 192. The engine system 100 may also include one or more other sensors 193. The ECM 114 may use signals from the sensors to make control decisions for the engine system 100.

The ECM 114 may communicate with a transmission control module 194 to coordinate shifting gears in a transmission (not shown). For example, the ECM 114 may reduce engine torque during a gear shift. The engine 102 outputs torque to a transmission (not shown) via the crankshaft. One or more coupling devices, such as a torque converter and/or one or more clutches, regulate torque transfer between a transmission input shaft and the crankshaft. Torque is transferred between the transmission input shaft and a transmission output shaft via the gears.

Torque is transferred between the transmission output shaft and wheels of the vehicle via one or more differentials, driveshafts, etc. Wheels that receive torque output by the transmission will be referred to as drive wheels. Wheels that do not receive torque from the transmission will be referred to as undriven wheels.

The ECM 114 may communicate with a hybrid control module 196 to coordinate operation of the engine 102 and one or more electric motors 198. The electric motor 198 may also function as a generator, and may be used to produce electrical energy for use by vehicle electrical systems and/or for storage in a battery. In various implementations, various functions of the ECM 114, the transmission control module 194, and the hybrid control module 196 may be integrated into one or more modules.

Each system that varies an engine parameter may be referred to as an engine actuator. Each engine actuator receives an actuator value. For example, the throttle actuator module 116 may be referred to as an engine actuator, and the throttle opening area may be referred to as the actuator value. In the example of FIG. 1, the throttle actuator module 116 achieves the throttle opening area by adjusting an angle of the blade of the throttle valve 112.

The spark actuator module 126 may also be referred to as an engine actuator, while the corresponding actuator value may be the amount of spark advance relative to cylinder TDC. Other engine actuators may include the cylinder actuator module 120, the fuel actuator module 124, the phaser actuator module 158, the boost actuator module 164, and the EGR actuator module 172. For these engine actuators, the actuator values may correspond to a cylinder activation/deactivation sequence, fueling rate, intake and exhaust cam phaser angles, boost pressure, and EGR valve opening area, respectively. The ECM 114 may generate the actuator values in order to cause the engine 102 to generate a desired engine output torque.

The ECM 114 and/or one or more other modules of the engine system 100 may implement the cylinder deactivation system of the present disclosure. For example, the ECM 114 selects a cylinder deactivation pattern from a plurality of base patterns based on one or more factors, including, but not limited to, engine speed, requested torque, a selected gear, air per cylinder (APC, e.g., an estimate or calculation of the mass of air in each cylinder), residual exhaust per cylinder (RPC, e.g., a mass of residual exhaust gas in each cylinder), and respective cylinder identifications (IDs). The selected cylinder deactivation pattern includes zero or more deactivated cylinders. The ECM 114 selectively activates the one or more deactivated cylinders to achieve a desired ECC.

For example only, the base patterns may only correspond to integer ECCs, and the desired ECC may be between integers (e.g., 6.5). Accordingly, the ECM 114 selectively activates one of the deactivated cylinders in a base pattern corresponding to an ECC of 6 to achieve the desired ECC of 6.5. For example, in a sequence of four repetitions of the base pattern, the ECM 114 activates one of the deactivated cylinders in two of the four repetitions. Consequently, in two of the repetitions, six cylinders are activated, and in the other two of the repetitions, seven cylinders are activated, resulting in an ECC of 6.5. In the two repetitions where one of the deactivated cylinders is activated, the ECM 114 may activate the same cylinder, or may alternate between activating a selected one of the two deactivated cylinders. For example, the ECM 114 may activate one of the two deactivated cylinders in one repetition, and activate the other of the two deactivated cylinders in another repetition. Or, the ECM 114 may activate one of the two deactivated cylinders in two of the four repetitions in a first period, and activate the other of the two deactivated cylinders in a second period. Accordingly, the deactivated cylinder that is selectively activated in selected repetitions of the base pattern is rotated between the deactivated cylinders.

For example only, the ECM 114 determines how often (i.e., a firing frequency) to activate (i.e., fire) a deactivated cylinder during operation of the base pattern, for ECCt<n, according to [ECCt−ECC']/{(ECC'+1)−ECC'}, where ECCt corresponds to a target (i.e., desired) ECC, ECC' corresponds to a largest integer ECC that is less than or equal to ECCt, and n corresponds to a total number of cylinders. Accordingly, when ECCt is 6.5 and ECC is 6, the firing frequency is 0.5, and therefore one of the deactivated cylinders is activated during half of the repetitions of the base pattern. When ECCt=ECC', the ECM 114 operates the cylinders according to the corresponding base pattern. When ECCt=ECC'=n, the ECM 114 activates all of the cylinders. The deactivated cylinder that is activated may be rotated to minimize N&V and/or to prevent any deactivated cylinder from being deactivated for an undesirable length of time. In some implementations, one or more deactivated cylinders in a base pattern may be "masked" to prevent those cylinders from being activated in the rotation. For example, one or more of the deactivated cylinders may be masked to minimize N&V. Further, when transitioning between values of ECC' (i.e., transitioning between base patterns), the ECM 114 may remain in a current base pattern until a deactivated cylinder that corresponds to an activated cylinder in a next base pattern is fired. The fired deactivated cylinder corresponds to the first fired cylinder in the next base pattern.

In other implementations, ECC' corresponds to a smallest integer ECC that is greater than or equal to ECCt, and one or more activated cylinders are deactivated in selected repetitions of the base pattern. In other words, instead of activating deactivated cylinders to increase the ECC of a base pattern, activated cylinders are deactivated to decrease the ECC of the base pattern. For example, if the ECCt is 6.5 and the ECC' is 7, then the deactivation frequency of the activated cylinders corresponds to [ECC'−ECCt]/{(ECC'−(ECC'−1)}, or 0.5. Accordingly, one of the activated cylinders is deactivated during half of the repetitions of the base pattern. This equation provides a similar but opposite result as the equation provided above. However, one equation could be used and the decision whether to deactivate one or more activated cylinders or to activate one or more deactivated cylinders could be made based on whether ECC' is greater than or less than ECCt. In still other implementations, the ECM 114 transitions between two or more base patterns to achieve the desired ECC. For example, if the desired ECC is 6.5, the ECM 114 may operate according to a base pattern corresponding to an ECC of 6 for half of a given period, and according to a base pattern corresponding to an ECC of 7 for the other half of the given period.

Figure 2:
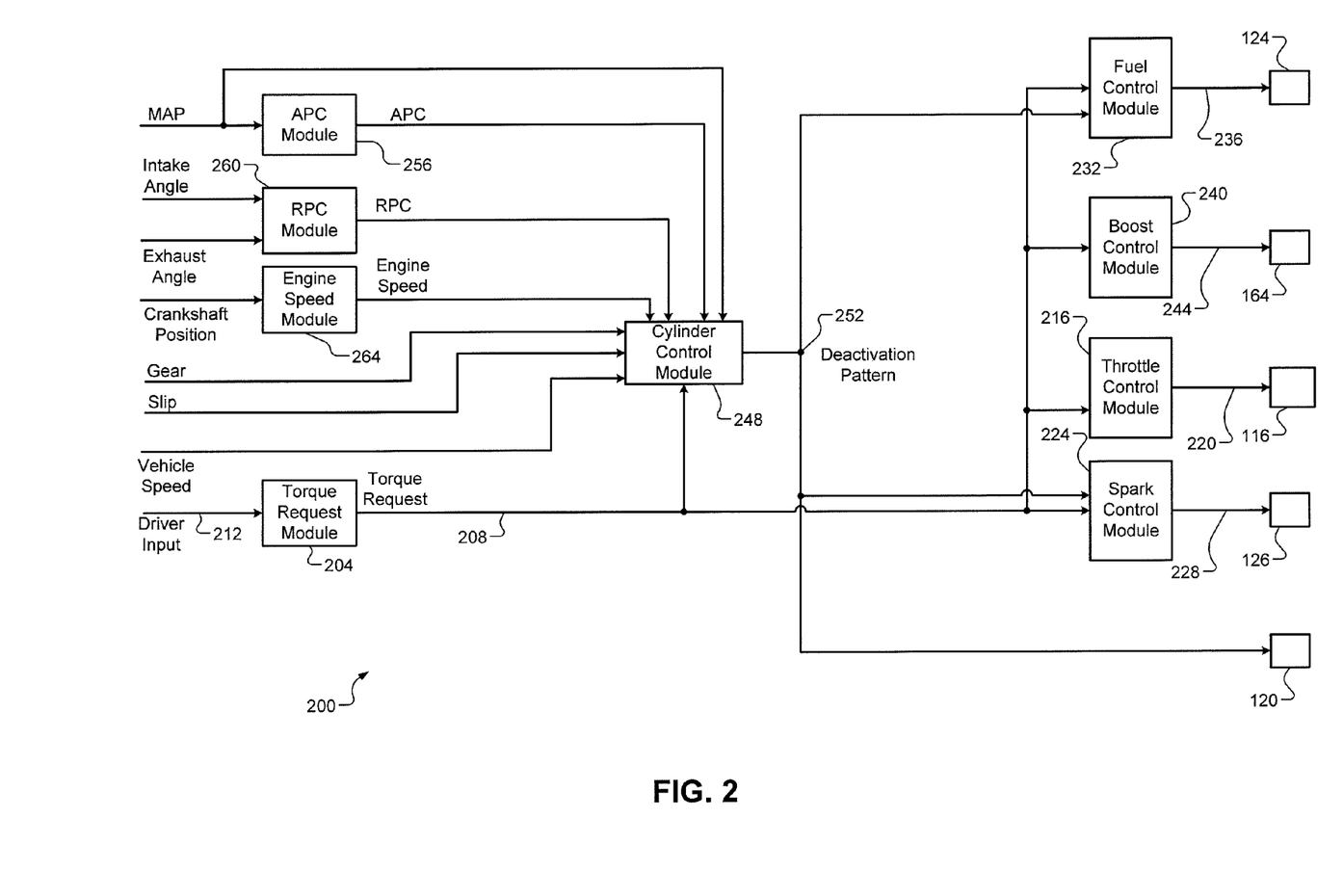
FIG. 2 is a functional block diagram of an engine control module according to the present disclosure.

Referring now to FIG. 2, a functional block diagram of an example engine control module (ECM) 200 is presented. A torque request module 204 may determine a torque request 208 based on one or more driver inputs 212, such as an accelerator pedal position, a brake pedal position, a cruise control input, and/or one or more other suitable driver inputs. The torque request module 204 may determine the torque request 208 additionally or alternatively based on one or more other torque requests, such as torque requests generated by the ECM 200 and/or torque requests received from other modules of the vehicle, such as the transmission control module 194, the hybrid control module 196, a chassis control module, etc.

One or more engine actuators may be controlled based on the torque request 208 and/or one or more other torque requests. For example, a throttle control module 216 may determine a desired throttle opening 220 based on the torque request 208. The throttle actuator module 116 may adjust opening of the throttle valve 112 based on the desired throttle opening 220. A spark control module 224 may determine a desired spark timing 228 based on the torque request 208. The spark actuator module 126 may generate spark based on the desired spark timing 228. A fuel control module 232 may determine one or more desired fueling parameters 236 based on the torque request 208. For example, the desired fueling parameters 236 may include fuel injection amount, number of fuel injections for injecting the amount, and timing for each of the injections. The fuel actuator module 124 may inject fuel based on the desired fueling parameters 236. A boost control module 240 may determine a desired boost 244 based on the torque request 208. The boost actuator module 164 may control boost output by the boost device(s) based on the desired boost 244.

Additionally, a cylinder control module 248 generates a desired cylinder activation/deactivation pattern 252 (e.g., from a plurality of base patterns) based on the torque request 208. The cylinder actuator module 120 deactivates the intake and exhaust valves of the cylinders that are to be deactivated according to the desired cylinder activation/deactivation pattern 252 and activates the intake and exhaust valves of cylinders that are to be activated according to the desired cylinder activation/deactivation pattern 252.

The cylinder control module 248 may select the desired cylinder activation/deactivation pattern 252 also based in part on, for example only, the APC, the RPC, the engine speed, the selected gear, slip, and/or vehicle speed. For example, an APC module 256 determines the APC based on MAP, MAF, throttle, and/or engine speed, an RPC module 260 determines the RPC based on an intake angle and an exhaust angle, EGR valve position, MAP, and/or engine speed, and an engine speed module 264 determines the engine speed based on a crankshaft position. The cylinder control module 248 selectively activates deactivated cylinders in the selected base pattern (and/or selectively deactivates activated cylinders in the selected base pattern) to achieve a desired ECC between integer ECCs.

Fueling is halted (zero fueling) to cylinders that are to be deactivated according to the desired cylinder activation/deactivation pattern 252 and fuel is provided the cylinders that are to be activated according to the desired cylinder activation/deactivation pattern 252. Spark is provided to the cylinders that are to be activated according to the desired cylinder activation/deactivation pattern 252. Spark may be provided or halted to cylinders that are to be deactivated according to the desired cylinder activation/deactivation pattern 252. Cylinder deactivation is different than fuel cutoff (e.g., deceleration fuel cutoff) in that the intake and exhaust valves of cylinders to which fueling is halted during fuel cutoff are still opened and closed during the fuel cutoff.

Figure 3:
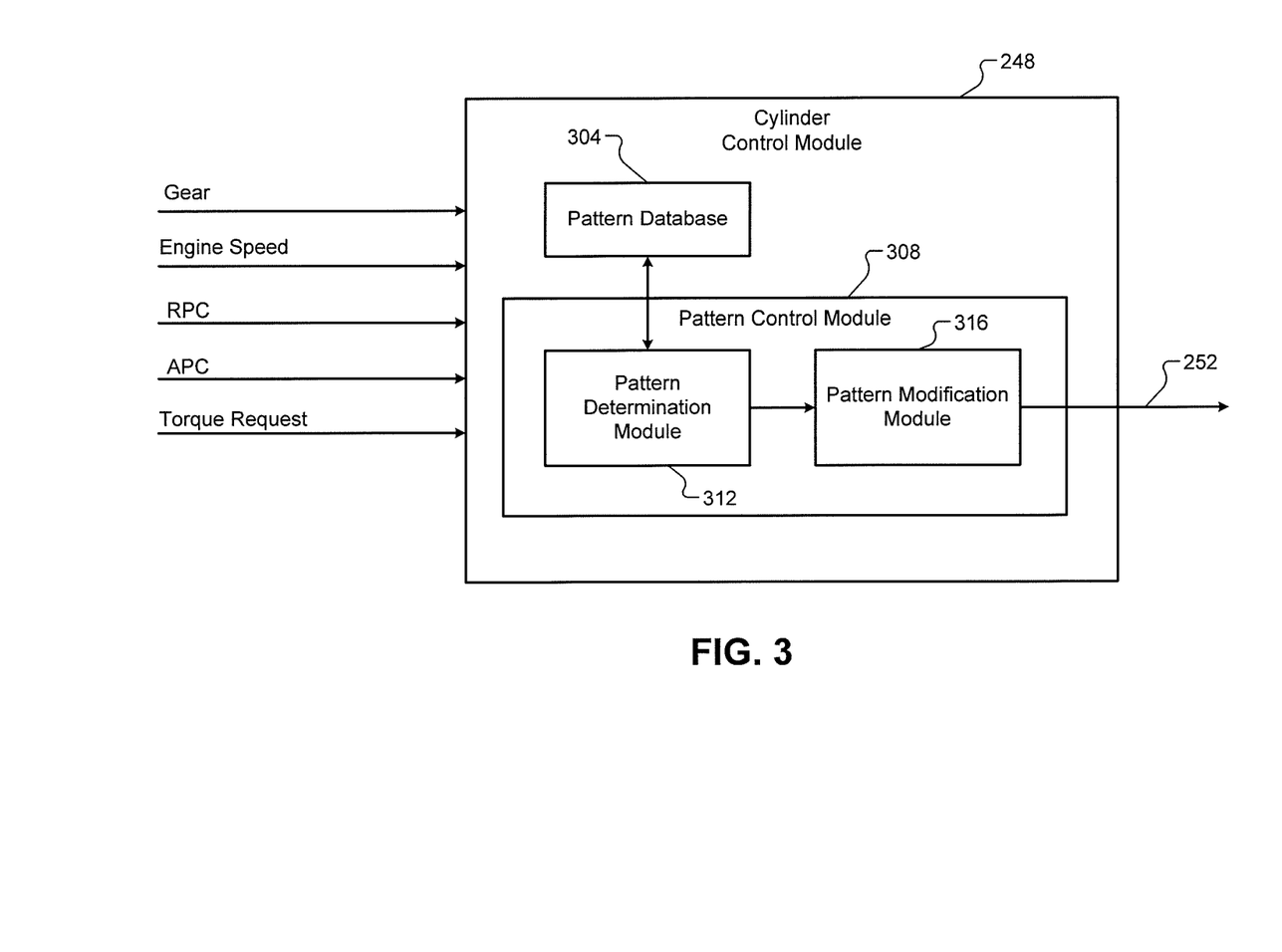
FIG. 3 is a functional block diagram of a cylinder control module according to the present disclosure.

Referring now to FIG. 3, an example implementation of the cylinder control module 248 is shown. A number N of predetermined cylinder activation/deactivation patterns (for example only, base patterns) are stored in a pattern database 304. N is an integer greater than or equal to 2 and may be, for example, 3, 4, 5, 6, 7, 8, 9, 10, or another suitable value. Each of the N predetermined cylinder activation/deactivation patterns includes an indicator for each of the next M events of a predetermined firing order of the cylinders. M is an integer that may be less than, equal to, or greater than the total number of cylinders of the engine 102. For example only, M may be 20, 40, 60, 80, a multiple of the total number of cylinders of the engine, or another suitable number. M may be calibratable and set based on, for example, the engine speed, the torque request, and/or the total number of cylinders of the engine 102.

Each of the M indicators indicates whether the corresponding cylinder in the predetermined firing order should be activated or deactivated. For example only, the N predetermined cylinder activation/deactivation patterns may each include an array including M (number of) zeros and/or ones. A zero may indicate that the corresponding cylinder should be activated, and a one may indicate that the corresponding cylinder should be deactivated, or vice versa.

A pattern control module 308 selects one of the N predetermined cylinder activation/deactivation patterns and sets the desired cylinder activation/deactivation pattern 252 to the selected one of the N predetermined cylinder activation/deactivation patterns. The cylinders of the engine 102 are activated or deactivated according to desired cylinder activation/deactivation pattern 252 in the predetermined firing order. The desired cylinder activation/deactivation pattern 252 may be repeated until a different one of the N predetermined cylinder activation/deactivation patterns is selected.

The pattern control module 308 includes a pattern determination module 312 and a pattern modification module 316. The pattern determination module 312 communicates with the pattern database 304 to select a cylinder activation/deactivation pattern based in part on the factors described in FIG. 2, including ECCt (which may be determined based on the torque request and/or other factors).

For example, the pattern determination module 312 may select one of the N predetermined cylinder activation/deactivation patterns having a number of activated cylinders corresponding to a nearest integer less than ECCt (or a nearest integer greater than ECCt). The pattern determination module 312 may select one of the N predetermined cylinder activation/deactivation patterns based on a ranking of the N predetermined cylinder activation/deactivation patterns. For example only, the N predetermined cylinder activation/deactivation patterns may be ranked as described in Provisional Patent Application No. 61/693,057, filed on Aug. 24, 2012, which is incorporated herein in its entirety.

The pattern modification module 316 receives the selected one of the N predetermined cylinder activation/deactivation patterns from the pattern determination module 312 and dynamically modifies the desired cylinder activation/deactivation pattern 252 as described above with respect to FIGS. 1 and 2. For example, the pattern modification module 316 receives the selected cylinder activation/deactivation pattern, which includes a number of fired cylinders corresponding to ECC', and modifies the selected cylinder activation/deactivation pattern to selectively activate one or more of the deactivated cylinders based on ECCt.

For example only, the pattern modification module 316 modifies one or more repetitions of the selected cylinder activation/deactivation pattern according to [ECCt−ECC']/{(ECC'+1)−ECC'}. The desired cylinder activation/deactivation pattern 252 output from the pattern modification module 316 includes the modifications. In other words, for some repetitions, the desired cylinder activation/deactivation pattern 252 corresponds to the selected deactivation pattern (e.g., a selected base pattern). In other repetitions, the desired cylinder activation/deactivation pattern 252 includes one or more additional activated cylinders to achieve ECCt. If more than one cylinder in the base pattern is deactivated, the pattern modification module 316 also determines which deactivated cylinders to activate in each repetition.

Figure 4:
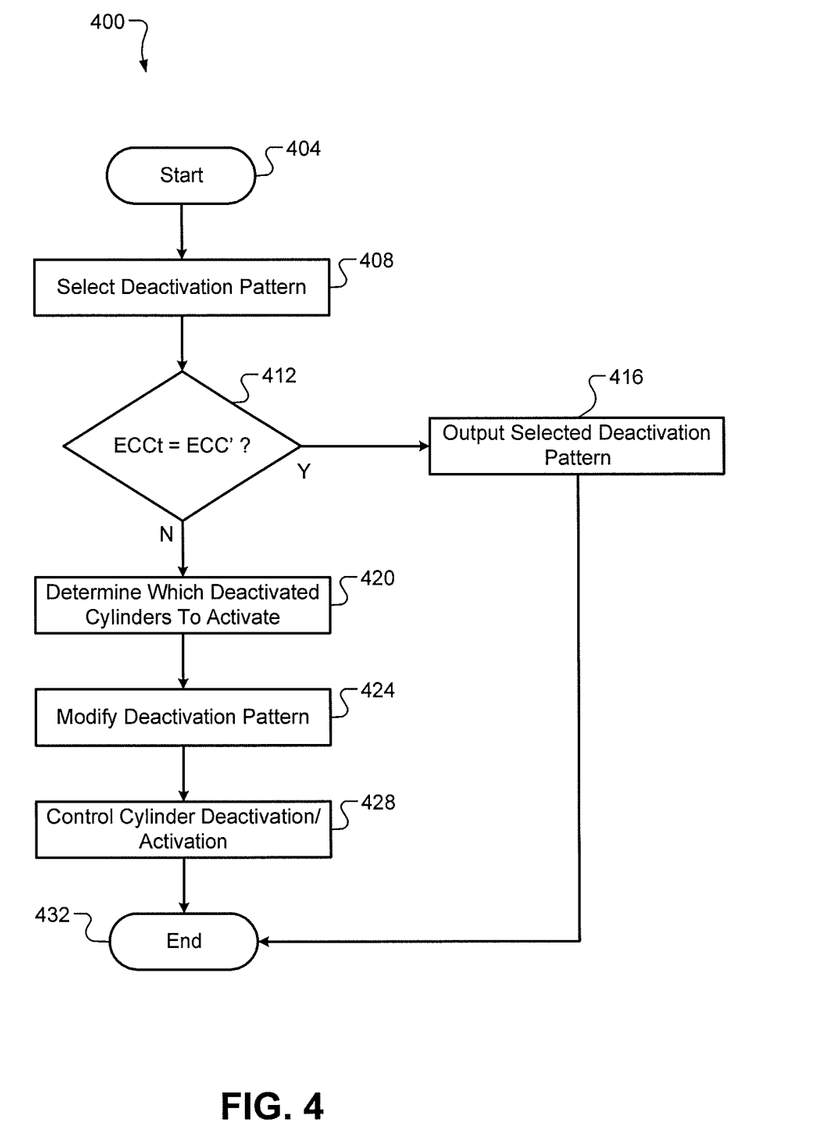
FIG. 4 is a functional block diagram of a cylinder deactivation method according to the present disclosure.

Referring now to FIG. 4, a cylinder deactivation method 400 begins at 404. At 408, the method 400 selects a cylinder activation/deactivation pattern. At 412, the method 400 determines whether the ECC of the selected cylinder activation/deactivation pattern (i.e., ECC') is equivalent to ECCt. If true, the method 400 continues to 416. If false, the method 400 continues to 420. At 416, the method 400 outputs the selected cylinder activation/deactivation pattern.

At 420, the method 400 determines which deactivated cylinder(s) in the selected cylinder activation/deactivation pattern to selectively activate, including how often to activate a deactivated cylinder (i.e., a firing frequency of the deactivated cylinder), and in which repetition of the deactivation pattern to activate the deactivated cylinder. At 424, the method 400 modifies the selected cylinder activation/deactivation pattern in selected repetitions of the selected cylinder activation/deactivation pattern. At 428, the method 400 controls cylinder deactivation/activation according to the selected cylinder activation/deactivation pattern. The method 400 ends at 432.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); a discrete circuit; an integrated circuit; a combinational logic circuit; a field programmable gate array (FPGA);

a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be partially or fully implemented by one or more computer programs executed by one or more processors. The computer programs include processor-executable instructions that are stored on at least one non-transitory tangible computer readable medium. The computer programs may also include and/or rely on stored data. Non-limiting examples of the non-transitory tangible computer readable medium include nonvolatile memory, volatile memory, magnetic storage, and optical storage.

What is claimed is:

1. A cylinder control system comprising:
a cylinder control module that:
   based on a desired average number of activated cylinders per sub-period of a predetermined period in the future including P sub-periods, selects one of N predetermined cylinder activation/deactivation patterns, the N predetermined cylinder activation/deactivation sequences each including M indicators for the next M cylinders, respectively, in a predetermined firing order of cylinders of an engine, and the M indicators each indicating whether to activate or deactivate the respective one of the M cylinders in the predetermined firing order,
   wherein M is an integer greater than a total number of cylinders of the engine, and
   wherein the one of the N predetermined cylinder activation/deactivation patterns corresponds to Q activated cylinders per sub-period, Q is an integer between zero and the total number of cylinders of the engine, inclusive, P is an integer greater than one, and the desired average number of active cylinders is a non-integer between zero and the total number of cylinders of the engine;
   determines an adjusted cylinder activation/deactivation pattern based on the one of the N predetermined cylinder activation/deactivation patterns;
   generates a desired cylinder activation/deactivation pattern for the predetermined period in the future using: (i) the one of the N predetermined cylinder activation/deactivation patterns during a first number of the P sub-periods and (ii) the adjusted cylinder activation/deactivation pattern during a second number of the P sub-periods;
   during the predetermined period, activates opening of intake and exhaust valves of first ones of the cylinders that are to be activated based on the desired cylinder activation/deactivation pattern; and
   during the predetermined period, deactivates opening of intake and exhaust valves of second ones of the cylinders that are to be deactivated based on the desired cylinder activation/deactivation pattern; and
a fuel control module that provides fuel to the first ones of the cylinders during the predetermined period and that disables fueling to the second ones of the cylinders during the predetermined period.

2. The cylinder control system of claim 1 wherein the cylinder control module changes one deactivated cylinder of the one of the N predetermined cylinder activation/deactivation patterns to an activated cylinder to determine the adjusted cylinder activation/deactivation pattern.

3. The cylinder control system of claim 2 wherein the cylinder control module changes one deactivated cylinder of the one of the N predetermined cylinder activation/deactivation patterns to an activated cylinder when Q is less than the desired average number.

4. The cylinder control system of claim 1 wherein the cylinder control module changes one activated cylinder of the one of the N predetermined cylinder activation/deactivation patterns to a deactivated cylinder to determine the adjusted cylinder activation/deactivation pattern.

5. The cylinder control system of claim 4 wherein the cylinder control module changes one activated cylinder of the one of the N predetermined cylinder activation/deactivation patterns to a deactivated cylinder when Q is greater than the desired average number.

6. The cylinder control system of claim 1 wherein the cylinder control module selects the one of the N predetermined cylinder activation/deactivation patterns based on Q being a nearest integer to the desired average number that is greater than the desired average number.

7. The cylinder control system of claim 1 wherein the cylinder control module selects the one of the N predetermined cylinder activation/deactivation patterns based on Q being a nearest integer to the desired average number that is less than the desired average number.

8. The cylinder control system of claim 1 wherein the cylinder control module further:
   determines a second adjusted cylinder activation/deactivation pattern based on the one of the N predetermined cylinder activation/deactivation patterns, wherein the second adjusted cylinder activation/deactivation pattern is different than the adjusted cylinder activation/deactivation pattern; and
   generates the desired cylinder activation/deactivation pattern for the predetermined period in the future further using the second adjusted cylinder activation/deactivation pattern during a third number of the P sub-periods.

9. A cylinder control method comprising:
based on a desired average number of activated cylinders per sub-period of a predetermined period in the future including P sub-periods, selecting one of N predetermined cylinder activation/deactivation patterns, the N predetermined cylinder activation/deactivation sequences each including M indicators for the next M cylinders, respectively, in a predetermined firing order of cylinders of an engine, and the M indicators each indicating whether to activate or deactivate the respective one of the M cylinders in the predetermined firing order,
wherein M is an integer greater than a total number of cylinders of the engine, and
wherein the one of the N predetermined cylinder activation/deactivation patterns corresponds to Q activated cylinders per sub-period, Q is an integer between zero and the total number of cylinders of the engine, inclusive, P is an integer greater than one, and the desired average number of active cylinders is a non-integer between zero and the total number of cylinders of the engine;

determining an adjusted cylinder activation/deactivation pattern based on the one of the N predetermined cylinder activation/deactivation patterns;

generating a desired cylinder activation/deactivation pattern for the predetermined period in the future using: (i) the one of the N predetermined cylinder activation/deactivation patterns during a first number of the P sub-periods and (ii) the adjusted cylinder activation/deactivation pattern during a second number of the P sub-periods;

during the predetermined period, activating opening of intake and exhaust valves of first ones of the cylinders that are to be activated based on the desired cylinder activation/deactivation pattern;

during the predetermined period, deactivating opening of intake and exhaust valves of second ones of the cylinders that are to be deactivated based on the desired cylinder activation/deactivation pattern;

during the predetermined period, providing fuel to the first ones of the cylinders; and during the predetermined period, disabling fueling to the second ones of the cylinders.

10. The cylinder control method of claim 9 wherein the determining the adjusted cylinder activation/deactivation pattern includes changing one deactivated cylinder of the one of the N predetermined cylinder activation/deactivation patterns to an activated cylinder.

11. The cylinder control method of claim 10 wherein the determining the adjusted cylinder activation/deactivation pattern includes changing one deactivated cylinder of the one of the N predetermined cylinder activation/deactivation patterns to an activated cylinder when Q is less than the desired average number.

12. The cylinder control method of claim 9 wherein the determining the adjusted cylinder activation/deactivation pattern includes changing one activated cylinder of the one of the N predetermined cylinder activation/deactivation patterns to a deactivated cylinder.

13. The cylinder control method of claim 12 wherein the determining the adjusted cylinder activation/deactivation pattern includes changing one activated cylinder of the one of the N predetermined cylinder activation/deactivation patterns to a deactivated cylinder when Q is greater than the desired average number.

14. The cylinder control method of claim 9 further comprising selecting the one of the N predetermined cylinder activation/deactivation patterns based on Q being a nearest integer to the desired average number that is greater than the desired average number.

15. The cylinder control method of claim 9 further comprising selecting the one of the N predetermined cylinder activation/deactivation patterns based on Q being a nearest integer to the desired average number that is less than the desired average number.

16. The cylinder control method of claim 9 further comprising:

determining a second adjusted cylinder activation/deactivation pattern based on the one of the N predetermined cylinder activation/deactivation patterns, wherein the second adjusted cylinder activation/deactivation pattern is different than the adjusted cylinder activation/deactivation pattern; and generating the desired cylinder activation/deactivation pattern for the predetermined period in the future further using the second adjusted cylinder activation/deactivation pattern during a third number of the P sub-periods.

* * * * *